United States Patent [19]

Laberinti

[11] 3,887,735

[45] June 3, 1975

[54] UPHOLSTERY ARTICLES AND PROCESS FOR THEIR MANUFACTURE

[75] Inventor: Cesare Laberinti, Milan, Italy

[73] Assignee: Industrie Pirelli, S.p.A., Milan, Italy

[22] Filed: Jan. 11, 1973

[21] Appl. No.: 322,844

[30] Foreign Application Priority Data
Jan. 11, 1972  Italy.................................. 19202/72

[52] U.S. Cl. .................... 428/71; 264/45; 428/143; 428/315
[51] Int. Cl.............................................. B32b 3/26
[58] Field of Search ........... 161/159, 160, 190, 165, 161/166; 264/45

[56] References Cited
UNITED STATES PATENTS 3,051,601  8/1962  Schick ................................ 161/159
3,487,134  12/1969  Burr................................... 161/160
3,576,706  4/1971  Baumann et al................... 161/160

Primary Examiner—William J. Van Balen
Attorney, Agent, or Firm—Stevens, Davis, Miller & Mosher

[57] ABSTRACT

The invention relates to improved moulded expanded polyurethane upholstery articles, in particular cushions for seats and seat backs. These articles are provided with an external layer or skin of pre-formed polyurethane material at least part of which, particularly the wearing surface of the cushion, is covered by a very thin top coat of pigmented compact polyurethane, less than 0.05 mm thick, joined directly to the skin by a strong chemical bond, and having a slip coefficient of at least 20° (UNI 4818 Standard).

7 Claims, No Drawings

UPHOLSTERY ARTICLES AND PROCESS FOR THEIR MANUFACTURE

The purpose of the present invention is that of improving the moulded expanded polyurethane upholstery articles provided with an external layer or skin of pre-formed polyurethane material, and the relative production process, as described in the pending U.S. application, Ser. No. 96,265 filed Dec. 8, 1970 and in its continuation-in-part application Ser. No. 251,683 filed May 9, 1972 now abandoned.

The U.S. application Ser. No. 96,265 concerns a moulded expanded polyurethane upholstery article consisting of an internal core of the said material with a pre-formed polyurethane skin, and characterized by the fact that the skin, which is microporous and is closely bonded to said internal core, has a very dense structure of cells uniformly distributed throughout its thickness, the majority of which do not communicate with one another and are less than 0.02 mm in diameter, and has a visible surface which is practically smooth and waterproof, and furthermore by the fact that the density value of such skin ranges between 0.4 and 0.8 gm/cm$^3$.

The process substantially consists in applying to the mould a thin coat of a first liquid mixture of reaction substances capable of forming a layer of self cross-linking microporous polyurethane constituting the skin of the article and, immediately following such application, pouring into the mould thus lined a second liquid mixture of reaction substances capable of forming the self cross-linking expanded polyurethane core of said article, without the use of any external application of heat throughout the entire process.

The continuation-in-part application concerns an upholstery article, particularly a cushion for seats or backs, with a fabric lining confined to the central area of the wearing surface or side. The process covered by said continuation-in-part application consists in applying said fabric, which has been waterproofed, to the inside of the mould prior to the introduction of the first liquid mixture, which is then applied to the mould and at least to the edges of the fabric.

The surface of the microporous skin of the upholstery is normally practically smooth. However, it is sometimes necessary for it to appear rough by moulding, e.g. for imitation natural leather; moreover it may sometimes be rough through using a mould whose surface is not itself completely smooth. The result is that the skin may be left with a rough surface capable of generating a certain amount of friction when rubbed against other materials, particularly when the latter are rough also. Such friction is all the more marked because the skin is itself yielding in the direction of its own thickness by virtue of its microporous structure. Furthermore, again because of the microporous structure, which has extremely thin intercellular walls, it is difficult to give the skin itself a given shade of colour (nuance), owing to the possibility of the upper part of the said structure altering the behaviour of the light passing through it.

In certain uses, it is desirable for the articles of upholstery covered by the above mentioned applications to have wearing surfaces with a high degree of slipperiness. This is particularly the case with car seats and seat backs, so as to give the driver, while in the sitting position, sufficient freedom of movement, even if the clothes which he is wearing are made of a fairly rough material.

Furthermore, the microporous upholstery skin covered by the pending U.S. application and its continuation-in-part application is soft to the touch, which makes it particularly valuable wherever the upholstery comes into direct contact with the human body, and in particular with the hands, as in the case of car seats and seat backs. It should be added that the said microporous skin has a steam permeability coefficient greater than 150 gr/1000 mm$^2$/24h (DIN 53333).

Consequently, the purpose of the present invention is the production of an article of upholstery in accordance with the U.S. application and its continuation-in-part application aforesaid, whose skin shall be free of the aforementioned friction, while retaining the same fundamental characteristics, and which shall be capable of presenting a pre-established shade of colour (nuance).

According to the present invention, at least a part of the microporous skin, and particularly that covering the wearing surface of a cushion, is covered with a very thin coat of compact and pigmented polyurethane, less than 0.05 mm thick, directly joined on top of the skin itself by virtue of a chemical bond therewith, such as to provide a slip coefficient of at least 20° (UNI 4818 Standard).

The high slip coefficient of the article, due to the presence of the very thin outer coating of compact polyurethane, is expressed in nonagesimal degrees in accordance with UNI 4818 Standard. The method of determining the slipperiness, as defined in the aforesaid Standard, consists of affixing the material whose slip coefficient is to be found to an adjustably inclinable surface, of placing upon such material a solid cylindrical body of known weight and dimensions and with a fabric-covered base, and of progressively increasing the inclination of the surface until a point is reached at which the said cylindrical body begins to slide freely, and finally of reading off on a goniometer the angle at which this point is reached.

The result is that the slip coefficient of at least 20° in accordance with UNI 4818 Standard means that the cylindrical body placed on the inclinable horizontal surface covered with a sample of microporous polyurethane skin with a very thin top coating of compact polyurethane, in accordance with the present invention, begins to slide when the inclination of the said surface reaches an angle of 20°.

The aforesaid very thin coating of pigmented polyurethane gives a high discoloration resistance to the microporous skin. Owing to its thinness, the said pigmented outer coating does not completely cover up the colour shade of the underlying microporous skin, which is also pigmented, with the result that the article of upholstery obtained in accordance with the present invention has a colour shade which results from the superimposition of the two colours of these two layers, of which one, i.e. the skin, is protected by the other both physically and from the point of view of discoloration.

The presence of the aforesaid thin coating neither reduces the agreeable tactile softness of the skin, nor reduces the latter's steam permeability.

The process of manufacturing this article of upholstery is characterized by the fact that before introducing into the mould the first liquid mixture intended to form the microporous skin, one applies to at least part of the said mould, and anyway to the areas to which the said first mixture is to be applied, a mixture of reaction substances in solution capable of forming a very thin coating of compact polyurethane, following which the solvent is made to evaporate, so that the reactions between the substances of this very thin coating take place mainly in conjunction with the reactions between the substances in the first and second mixture.

A release agent may be added to the very thin coating of compact polyurethane, to enable it to automatically come free from the mould, if the mould itself does not possess not-stick qualities.

Since the invention has been described simply by a non-limitative exemplification, it is intended that the patent shall cover all modifications to the invention and its particular features which are inspired by the basic principles upon which the invention itself is based.

What I claim is:

1. In an article of upholstery molded in expanded polyurethane comprising an inner core of expanded polyurethane and a cover comprising a microporous polyurethane skin chemically bonded to said inner core, the improvement which comprises at least part of the surface of the microporous skin being covered by a very thin top coat of pigmented compact polyurethane, less than 0.05 mm thick, joined directly to the skin by a strong chemical bond, and having a slip coefficient of at least 20° (UNI 4818 Standard).

2. The article of claim 1 in the form of a cushion for seats and seat backs.

3. The article of claim 1 wherein the surface of the microporous skin being covered is the wearing surface of a cushion.

4. Article of upholstery in accordance with claim 1, characterized by the fact that through the effect of the very thin top coating of pigmented polyurethane, the skin is given high discoloration characteristics.

5. Article of upholstery in accordance with claim 1, whose skin has a steam permeability value greater than 150 gr/1000 mm$^2$/24h (DIN 53333), characterized by the fact that despite the presence of the very thin top coating as aforesaid, the skin retains the same steam permeability.

6. The upholstery article of claim 1 wherein the microporous polyurethane skin has a density from 0.4 to 0.8 gm/cm$^3$.

7. The upholstery article of claim 1 wherein the microporous polyurethane skin has a very dense structure of cells uniformly distributed throughout its thickness, the majority of the cells not communicating with one another and being less than 0.02 mm in diameter.

* * * * *